US011030694B2

(12) United States Patent
Hansen et al.

(10) Patent No.: US 11,030,694 B2
(45) Date of Patent: Jun. 8, 2021

(54) PROCESS FOR PROVIDING TIMELY QUALITY INDICATION OF MARKET TRADES

(71) Applicant: NYSE Group, Inc., New York, NY (US)

(72) Inventors: Peter Hansen, Stamford, CT (US); Nicolay Landmark, Hall Green (GB); Lars Kragh, Stamford, CT (US)

(73) Assignee: NYSE Group, Inc., New York, NY (US)

( * ) Notice: Subject to any disclaimer, the term of this patent is extended or adjusted under 35 U.S.C. 154(b) by 0 days.

(21) Appl. No.: 17/010,758

(22) Filed: Sep. 2, 2020

(65) Prior Publication Data

US 2020/0402174 A1 Dec. 24, 2020

Related U.S. Application Data

(63) Continuation of application No. 10/825,726, filed on Apr. 15, 2004, now Pat. No. 10,796,364.

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC .............................. G06Q 40/04; G06Q 40/00
See application file for complete search history.

(56) References Cited

U.S. PATENT DOCUMENTS

| 5,161,103 A | 11/1992 | Kosaka et al. |
| 5,339,392 A | 8/1994 | Risberg et al. |
| 6,453,303 B1 | 9/2002 | Li |
| 7,110,969 B1 | 9/2006 | Bennett et al. |

(Continued)

FOREIGN PATENT DOCUMENTS

| CN | 1153562 A | 7/1997 |
| CN | 1245574 A | 2/2000 |

(Continued)

OTHER PUBLICATIONS

Chinese Official Action dated Jun. 1, 2015 in corresponding Chinese Patent Application No. 201210295859.0 along with an English translation.

(Continued)

*Primary Examiner* — Scott S Trotter
(74) *Attorney, Agent, or Firm* — DLA Piper LLP (US)

(57) ABSTRACT

Real time or near real time assessment of the quality of securities transactions is accomplished by intercepting order and execution communications between trader and broker, comparing the execution data with contemporaneous market data relative to the transaction or transactions involved, and informing the trader of that comparison. This is accomplished without interrupting or impeding the trader-broker communications, except that a broker-trader communication may, if desired, be interrupted and relevant data aggregated until the aggregate reaches a desired value. It is preferred that the comparison be between the volume-weighted average price of the securities transaction and the volume-weighted average price of the market data for that security, over the life of the order. A particular effective way to communicate the quality evaluation to the trader is disclosed.

27 Claims, 6 Drawing Sheets

(56) References Cited

U.S. PATENT DOCUMENTS

| | | | |
|---|---|---|---|
| 2002/0013176 | A1 | 1/2002 | Yoshimi et al. |
| 2002/0016756 | A1 | 2/2002 | Rinaldi |
| 2002/0099646 | A1 | 7/2002 | Agarwal et al. |
| 2003/0050879 | A1 | 3/2003 | Rosen et al. |
| 2003/0163469 | A1 | 8/2003 | Garth et al. |
| 2003/0177085 | A1 | 9/2003 | Buckwalter et al. |
| 2003/0225660 | A1 | 12/2003 | Noser et al. |
| 2004/0059628 | A1 | 3/2004 | Parker et al. |

FOREIGN PATENT DOCUMENTS

| | | |
|---|---|---|
| CN | 1359072 A | 7/2002 |
| CN | 1468410 A | 1/2004 |
| WO | 95/18418 | 7/1995 |
| WO | 03/105055 A1 | 12/2003 |

OTHER PUBLICATIONS

Canadian Official Action dated Mar. 27, 2015 in corresponding Canadian Patent Application No. 2,578,655.

Chinese Official Action dated Jan. 12, 2016 in corresponding Chinese Patent Application No. 200580015581.5 along with an English Summary.

Chinese Official Action dated Jan. 19, 2016 in corresponding Chinese Patent Application No. 201210295859.0 along with an English Summary.

Brazilian Official Action dated Mar. 27, 2017 in corresponding Brazilian Patent Application No. PI05009937-4.

Canadian Office Action dated Aug. 14, 2017 in corresponding Canadian Patent Application No. 2,578,655.

Unknown, Electronic Mailing List, Jan. 23, 2004, Wikipedia.org, Definition of Electronic Mailing List.

Unknown, Blind Carbon Copy, Nov. 5, 2003, Wikipedia.org, Definition of Blind Carbon Copy.

Unknown, Packet Analyzer, Aug. 11, 2002, Wikipedia.org, Packet Analyzer Definition.

Quality of Execution, LLC, www.qualityofexecution.com, Jun. 20, 2003.

Non-Disclosure Agreement Between Two Companies, www.mbadesk.com/agreements, Dec. 4, 2003.

http://web.archive.org/web/20020603130901/www.tradewiser.com/borkers.shtml.

PROCESS FOR PROVIDING TIMELY QUALITY INDICATION OF MARKET TRADES

FIELD OF THE INTENTION

The present invention relates to electronic communication networks utilized for securities trading and more specifically to a system and method which allows for real time or near real time execution quality indications to financial market traders and others.

BACKGROUND OF THE INVENTION

Markets have existed for centuries which allow people to buy and sell securities (e.g., stocks, futures, options, commodities, etc.). Today, examples of these markets in the United States are: The New York Stock Exchange (NYSE), The National Association of Security Dealers Automated Quotation (NASDAQ) System, and The American Stock Exchange (AMEX). These modern security markets facilitate the exchange of over two billion shares of stock every business day.

Investors, either personally or through professional intermediaries (hereinafter generally designated "traders") typically place orders with brokers, who then execute the orders, typically through buying or selling financial instruments (stocks, investment instruments, options, bonds, etc.) in the open market. For large orders, the process by which the financial instruments are obtained is not trivial—the trader or broker has to manage the way the order impacts the market to avoid affecting the price, as well as generally securing the best possible price for the trader. The broker's performance in this regard is of interest to the trader. The trader will prefer to use a broker that gets better prices.

The need for "broker report cards" and "league tables" to determine which broker is best for a given financial instrument is well known, and several companies already provide such a service. For example, TAG provides a monthly report that shows this kind of information. The problem with the current state of the art is that the information is not available in real time. It would be a great benefit for a trader to be able to see how good a job the broker is doing on a particular order as it is actually being executed in the market. Accordingly, what is needed is a method for providing an indication of execution quality in real time, or near real time, so the trader will know immediately whether a particular order or series of orders is being handled well.

SUMMARY OF THE INVENTION

The present invention is a system to track the quality of order execution in real time, or near real time, so the investor will know immediately whether a particular order is being handled well. Additionally, statistics may be kept over a longer term, so broker performance over longer time periods than one day or one order can be monitored.

Executions are currently sent back electronically to the trader from the executing venue. The present invention introduces an intercept in the electronic data connection between the executing broker and the trader's order management system. This non-intrusive intercept records the orders and executions without interfering with the communications between the trader and the executing venue, and sends the information to an Execution Quality Calculation Module ("EQCM"). The EQCM furthermore has access to market data via an electronic link. The EQCM calculates the execution quality in real time (or near real time) and displays the results to the trader.

According to a preferred embodiment of the invention, the execution quality is calculated as the difference between the volume-weighted average price ("VWAP") of the trader's executions and the VWAP of the market data for that security, over the life of the order. This difference can be displayed as a number, or represented graphically. In particular, the invention can keep track of the execution quality for one or more orders, and indicate to the trader if the value is departing from certain limits. This warning can be visible or audible, or both. Furthermore, an indication of the order's price impact on the market may be given, by displaying to the trader the relative size of his own executed trades compared to the volume being traded in that security by other market participants.

DESCRIPTION OF THE PREFERRED EMBODIMENTS

An entity which wishes to buy or sell a security acts either personally or through some other entity (here generally termed a "trader") to execute the particular transaction involved. The trader buys or sells the direct financial instrument through the services of an executing broker. The process for handling the order requires experience and skill. The trader not only should secure the best price for himself or his client, the investor, as the case may be, but in so doing has to manage the way in which the particular order in question impacts the market, since that impact can affect the price paid. It is therefore of importance to the trader to work through a broker who performs best from the point of view of the trader and this, of course, significantly involves the skill of the broker who has been selected. Particularly with high trading activity it is important to be able to evaluate the performance of the broker that has been selected so that, the best broker can be selected for subsequent transactions.

Figure 1:
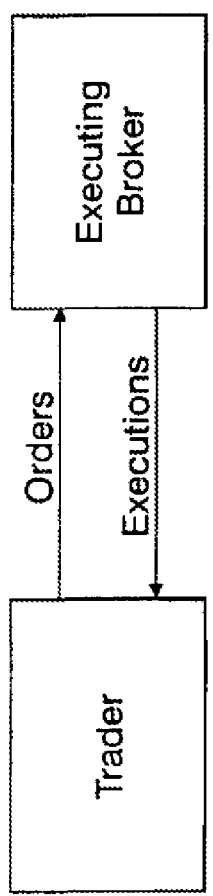
FIG. 1 is a diagram illustrating the normal communications between traders and brokers.

As indicated in FIG. 1, the normal security transaction involves an electronic order, typically using FIX from the trader to the executing broker to carry out a certain purchase or sale and, during or after the transaction, a communication from broker to trader of the details of the transaction. An order may be outstanding in the market for an extended period of time, even days, weeks or months, and the trade may ten get continuous updates as partial executions occur in the market. The present invention will enable the trader to maintain an overview of execution quality at all times, even before that order has been completely filled. The order information from trader to broker and the execution information from the executing venue to trader are ordinarily accomplished electronically over a suitable communications link in machine-readable form.

Figure 2:
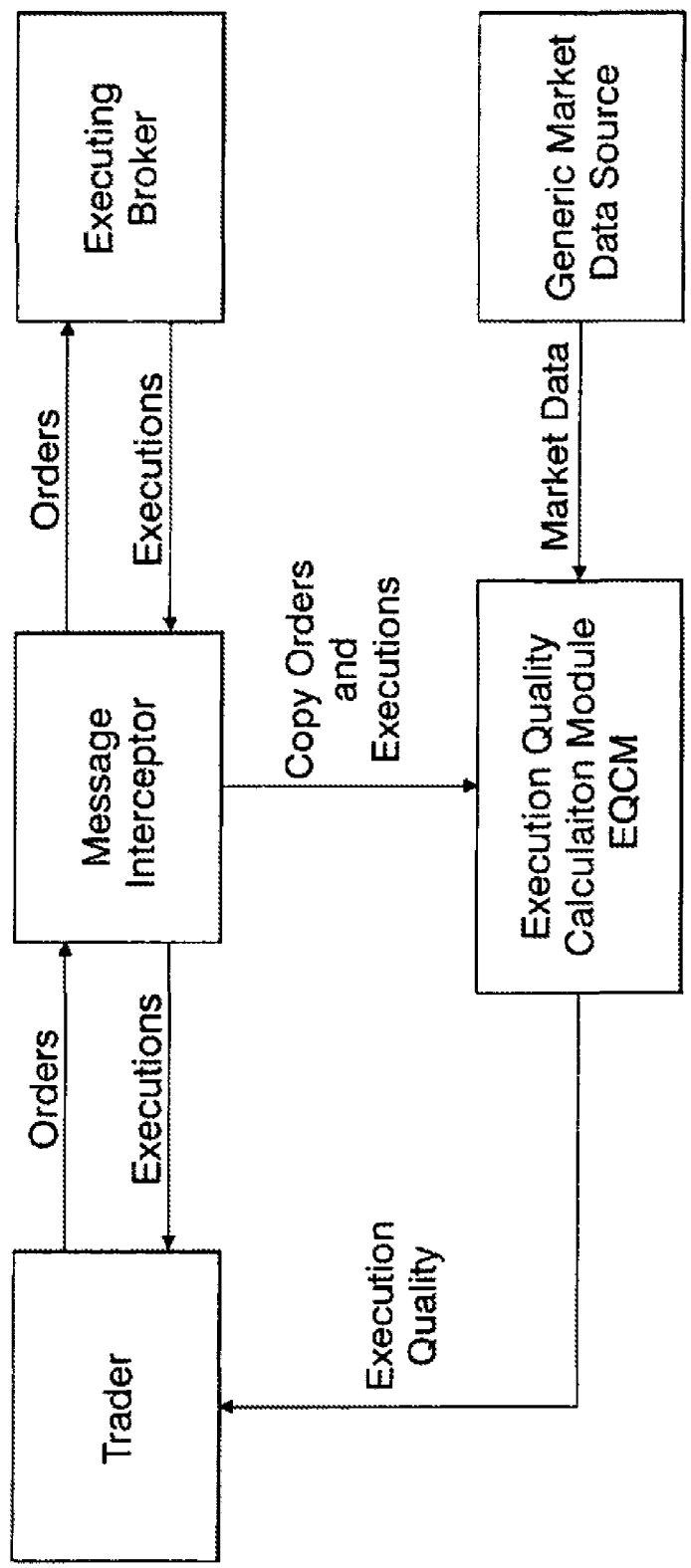
FIG. 2 is a diagrammatic representation of one aspect of the system of the present invention.

The entity in charge of the communication link between trader and broker is thus in a particularly strategic position to determine and convey to the ultimate investor or other trader whether the executing broker is performing optimally, or to convey to the ultimate investor or other trader whether the executing broker is performing optimally, because the communication entity has real time access to the trader/broker and market communications. Consequently, in accordance with the present invention, and as indicated in FIG. 2, when evaluation of a particular order or orders is desired the relevant order communication is sensed by a message interceptor and the identity of the order or orders to be evaluated is sent to an EQCM where that information is stored. As the order is being processed the executing venue sends execution information back to the trader over an appropriate accessible communications link. The message interceptor will intercept relevant execution information identified by the previously stored order information (a single order will often involve a plurality of executions), and will send that execution information to the EQCM. That module will also receive up-to-date market data relative to the transaction in question on a real time basis and will compare that relevant market data with the execution data. It will then convey that comparison, which is a measure of the quality of the particular execution in question, to the entity ("trader") seeking that information. The interception of order data and in most cases of execution data is carried out without restricting the transmission of the data between trader and or market broker; the relevant data is merely accessed and sent to the calculating module. That module may be connected to a generic market data source which maintains up to date data on the current prices of the securities in question, the calculation module obtaining data from that source with respect to the particular security then being evaluated.

It is preferred to calculate the execution quality of a particular transaction or transactions by the difference between the volume-weighted average price of the executions in question and the volume-weighted average price (VWAP) of the market data for that security over the life, of the order. Alternatively, the comparison can be with the last execution price before the order was entered, or with the average (possibly VWAP) execution price for some time before the order was entered. The difference can be displayed in any appropriate manner, as by number or by a graphical representation. In particular, the process can keep track of the execution quality for one or more orders from a given trader and indicate to the trader if the value is departing from certain limits. This warning can be visible, audible, or both.

Preferably also, the system can indicate a given order's volume impact on the market by displaying to the trader the relative size of his own executions compared to the volume being traded in the security by other market participants.

Figure 3:
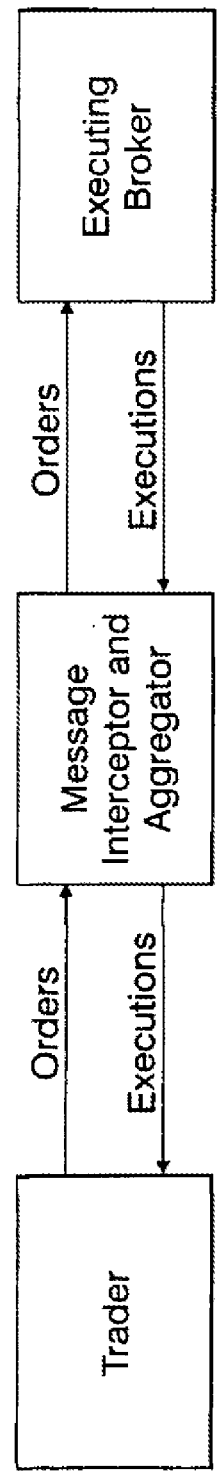
FIG. 3 is a diagrammatic representation of an additional optional feature in the process of the present invention.

While one of the main advantages of the system of the present invention is that it functions from the trader-client transmission in real-time without interfering with that transmission, there is one set of circumstances where the processing of the present invention can, if desired, be designed to interfere with the transmission of execution information from broker to trader but without impeding the real time evaluation of transaction quality. Currently an executing venue or broker can "bunch up" executions before transmitting them to the trader in larger lots (e.g., 5 executions of 100 shares each might be sent as one execution of 500 at the average price of the five). This is a service that the broker has traditionally provided as a convenience to the trader— sparing the trader from having to deal with large numbers of small executions. Also, some order management systems are known to suffer performance degradation when presented with a large flow of small executions. The major disadvantage of executing broker "bunching" is that with such "bunching" the trader cannot track execution quality in real-time unless all the executions are transmitted at or near the time they actually happen in the market. Hence, if desired, and as is illustrated in FIG. 3, the executing broker may still send execution data to the trader immediately as the relevant transactions occur, permitting the system to perform real time execution quality calculations, but in this embodiment the interceptor itself can act as a "bunching" agent, aggregating executions and transmitting them to the trader only in larger lots, the size of the lot being determined by the trader. With this bunching of the multiple small executions into a smaller number of larger executions an average price for the transactions can be computed by the system and transmitted to the trader and, if desired, used as the evaluation criterion.

While the quality evaluation can be communicated to the trader in a wide variety of arrays, a particularly effective and helpful (to the trader) way is by means of computer assisted displays. We have invented a display protocol disclosed in FIGS. 4-7 which in general and in detail is very valuable.

Figure 4:
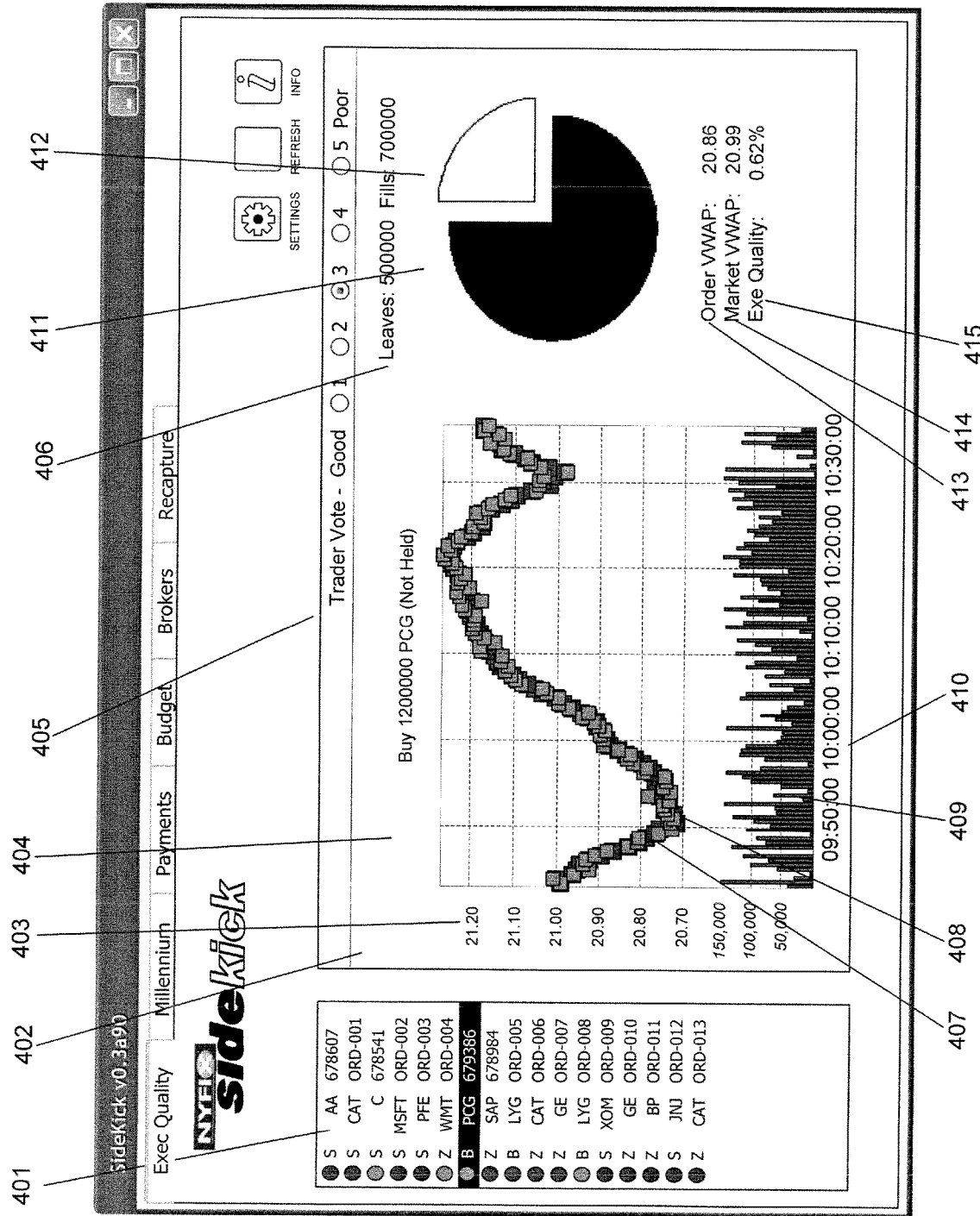
FIG. 4 is a screen through which the system displays real time (or near real time) execution quality as related to currently open orders.

In FIG. 4 the computer system presents a trader with means to view the execution quality. The trader selects an order from the list 401 as an input field for identifying the order to be analyzed in the display panel 402. The row of bulbs at the left of the list 401 display colors which indicate the execution quality of the order in question. The point graph displays market execution data for the selected order's stock symbol as green points 407, while executions by others in that stock symbols are overlaid using red points 408. The volume for each transaction is indicated with bars 409. The abscissa axis is the time of day 410, while the ordinates 403 are volume for the lower graph, prices for the upper.

A label 404 indicates whether the selected order was buy, sell or sell short—as well as the order quantity, stock symbol, and special handling instructions e.g. Not Held. To the right of the screen a pie chart indicates what proportion of the market volume was executed for the selected order 412, and what proportion was executed by the rest of the market 411.

Under the pie chart, an average price is indicated for the selected order 413, for the rest of the market 414. The execution quality is indicated by the label 415.

Means for entering a trader vote is provided by a row of buttons 405. Once the trader has selected one of the values, the opportunity to make a written comment to the selected order is provided (not shown).

Figure 5:
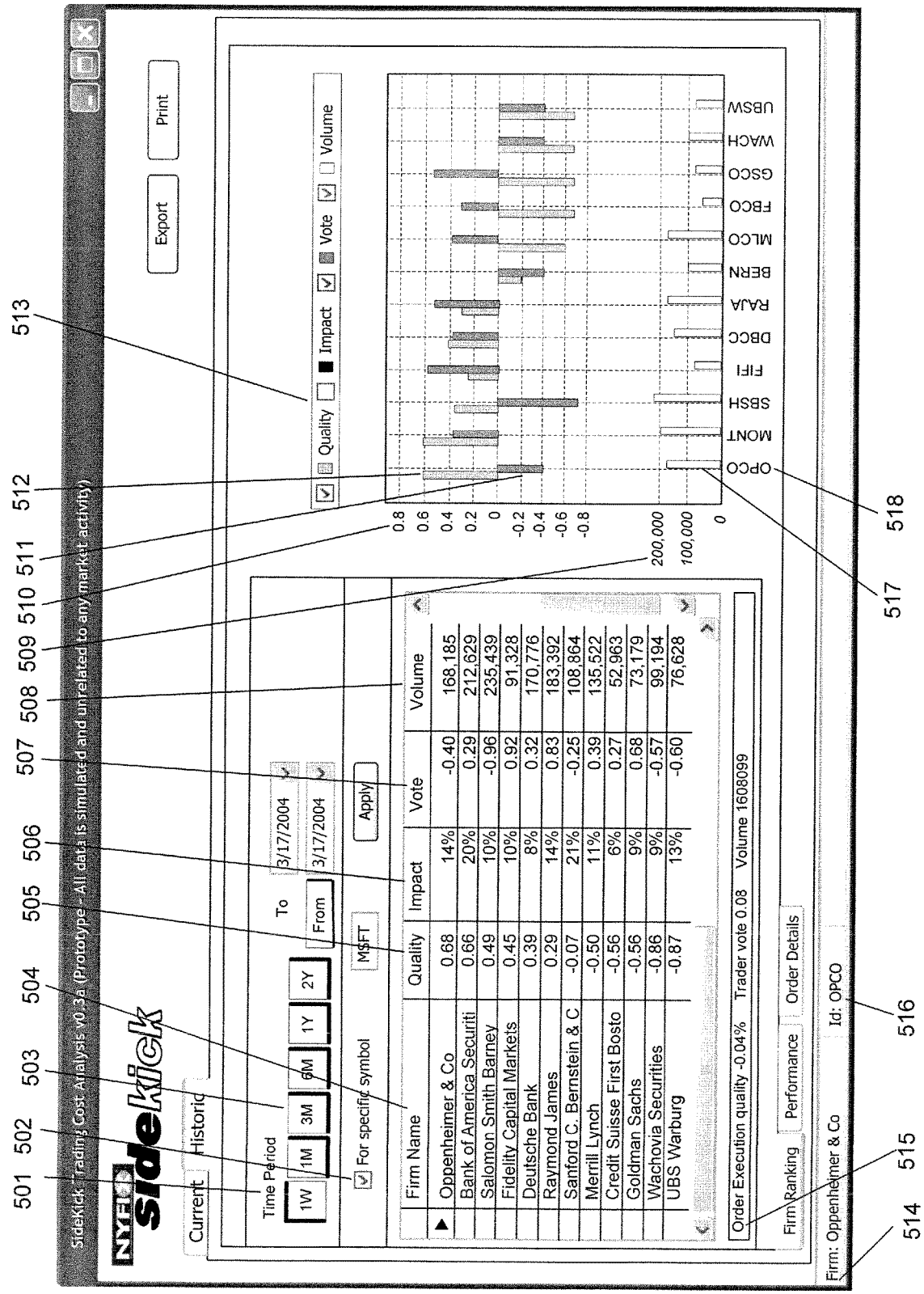
FIG. 5 is a screen through which the system displays historic relative performance ranking of executing brokers, the performance benchmarks being execution quality, volume impact, trader vote, and total volume.

Turning to FIG. 5, the purpose of the screen is to rank the executing venues (brokers) according to the performance benchmarks execution quality, volume impact, trader vote, and total volume. A panel 501 provides means for selecting a time period for analysis, with means for quickly setting standard time periods 503. The results are shown in a table with columns Firm Name 504, Quality 505 (execution quality), Impact 506 (percentage of market volume captured), Vote 507 (trader vote), Volume 508 (total volume traded). The figures in these columns are summaries, over the selected time period. By clicking on one of the column headings, the table will be sorted, normally in descending order, by the values in that column. Optionally, the information in the table can be made to pertain to one single symbol, by means of providing an input in panel 502.

The data in the table is also displayed graphically on the right of FIG. 5, where the legend 513 also acts as means to select which data the user wishes to display on the graph (in this example, "Quality," "Vote," and "Volume" have been selected for display). The abscissas 518 for all data are firm mnemonics that identify each broker. The total volume is shown as a bar graph 517 with ordinates 509. The trader vote and execution quality are shown as bar graphs 511 and 512 respectively, with ordinates 510.

At the bottom of the screen, the currently selected firm is indicated in the panel 514. The firm's identifying mnemonic is indicated in panel 516.

Figure 6:
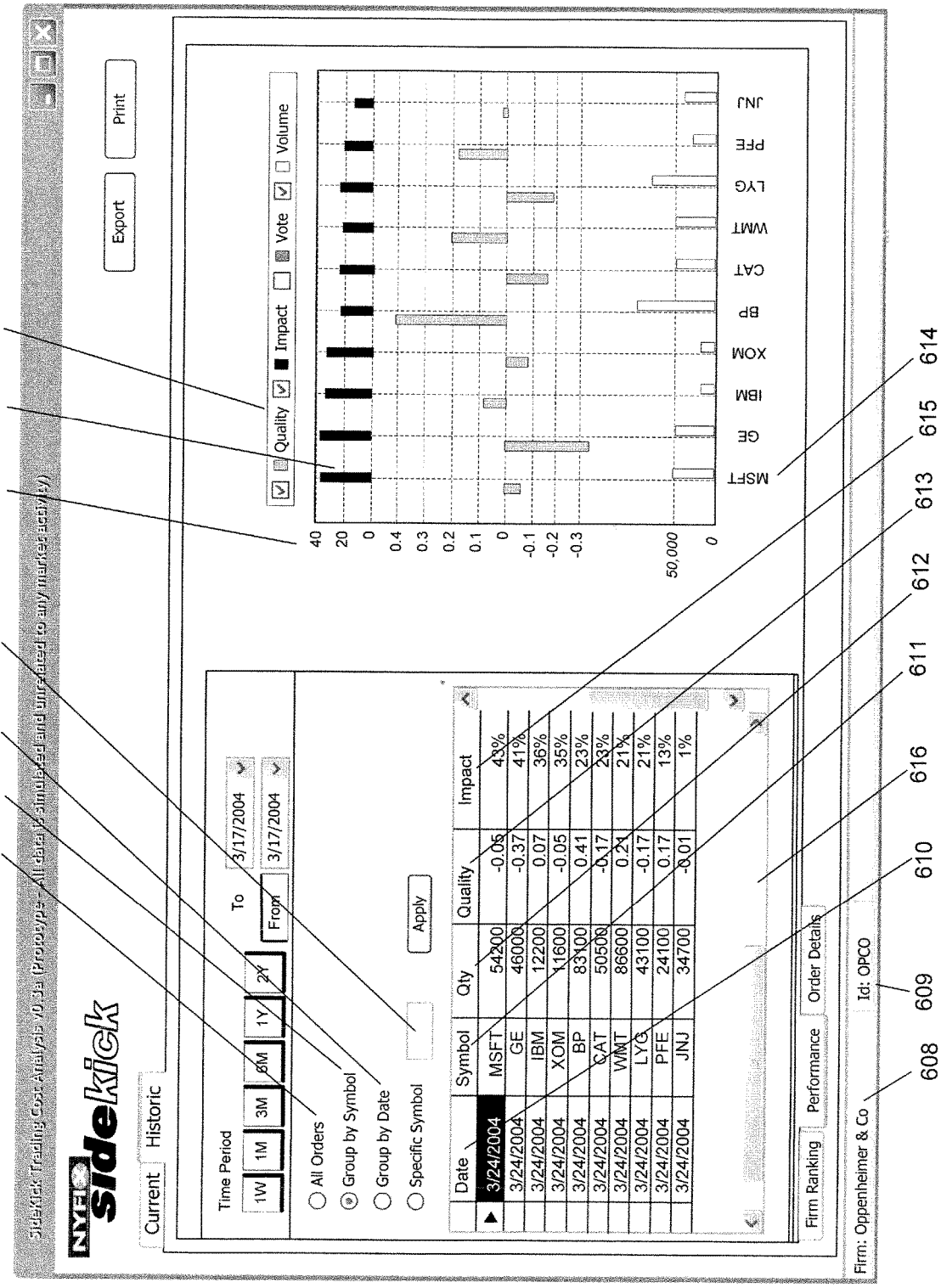
FIG. 6 is a screen through which the system displays the historic performance of one particular broker, the performance benchmarks being execution quality, volume impact, trader vote, and total volume.

The screen in FIG. 6 displays similar information to FIG. 5, with the primary difference being that the information applies to the selected firm only (indicated in panels 608 and 609). The orders for the selected firm for the selected time period are listed in the table with headings "Date" 610 (order date), "Symbol" 611 (stock ticker symbol), "Qty" 611 (order qty), "Impact" 615 (proportion of market volume acquired for this order while it was open). Column headed "Vote" (Trader Vote) is not shown, but can be made visible by means of a horizontal scroll bar 616. The table can be sorted as with the screen of FIG. 5 by clicking on the table headings. Also shown in FIG. 6 is the "Impact" bar graph 606, which is visible due to being selected in the panel 607. The abscissae on this graph are the stock ticker symbols 614. The ordinates for the "impact" bar graph are at the top left of the chart 605.

Figure 7:
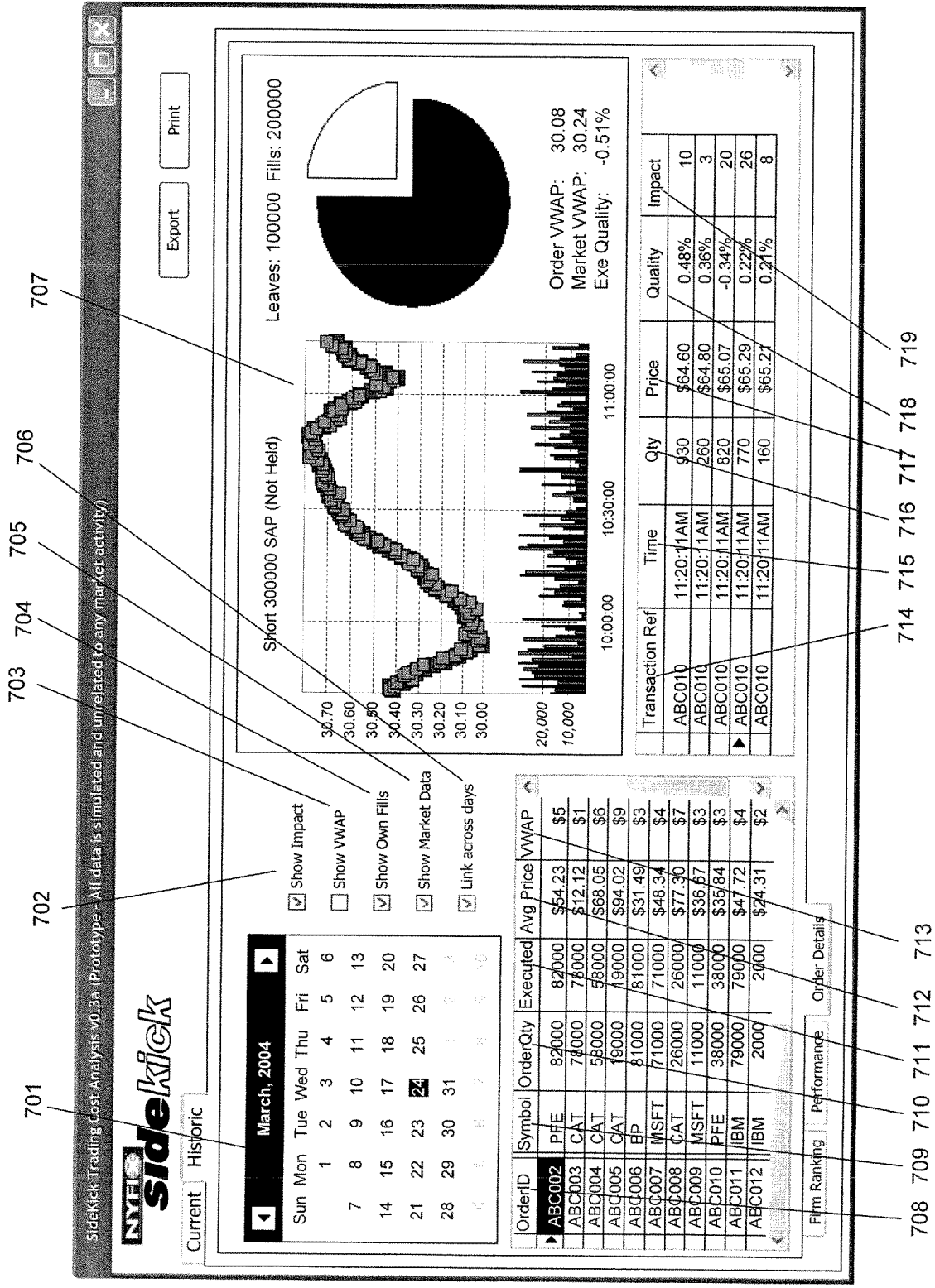
FIG. 7 is a screen through which the system displays historic details and market data pertaining to a particular order, as well as performance benchmarks execution quality, volume impact, trader vote, and total volume.

Turning to FIG. 7, the screen displays detailed information about all orders for the selected firm on selected dates. The dates are selected by clicking in the calendar 701. The orders are shown in the table below the calendar, with headings "Order ID" 708 (Order identifier), "Symbol" 709 (stock ticker symbol), "OrderQty" 710 (order quantity), "Executed" 711 (actually executed quantity), "Avg Price" 712 (Order average price), "VWAP" 713 (Order volume weighted average price). A specific order is selected by clicking on it in this table. By means of a number of check boxes, the graph 707 (which is similar to FIG. 4) can be made to display various information. The control marked "Show Impact Pie" 702 enables or disables the display of the pie chart. The control marked "Show VWAP" 703 enables/disables displaying the VWAP price as a line on the price graph. The control marked "Show Own Fills" 704 enables and disables the display of own orders' executions on the price graph. The control marked "Show Market Data" 705 enables and disables the display of market data not belonging to the selected order. The control marked "Link across days" 706 prompts the system to display several days' worth of data, for orders that remained open more than one trading day. Details of the executions against the selected order are displayed in the table below the graph with heading "Transaction Ref" 714 (Transaction identification), "Time" 715 (date/time of the execution), "Qty" 716 (Execution quantity), "Price" 717 (Execution price), "Quality" 718 (Execution quality), and "Impact" 719 (Percentage market share for this order).

While only a limited number of embodiments in the present invention have been specifically described above it will be apparent that many variations may be made therein, all without departing from the spirit of the invention as described in the following claims.

The invention claimed is:

1. A computer system, comprising:
one or more processors configured to execute machine-readable instructions;
a message intercept module operatively coupled to the one or more processors, the message intercept module in communication with a trader system and an executing venue system via one or more communication links and configured to:
detect electronic transmissions between the trader system and the executing venue system, and
copy at least one of electronic order information and order execution details from the electronic transmissions without impeding any of said electronic transmissions;
an execution quality calculation module (EQCM) operatively coupled to the one or more processors, the EQCM in communication with the message intercept module and configured to:
receive the electronic order information and the order execution details from the message intercept module,
receive real-time market data contemporaneously with the order execution details, the real-time market data originating from an external data source,
determine an execution quality based on the real-time market data and the order execution details, and
transmit the execution quality to said trader system; and
an interactive graphic user interface (GUI) operatively coupled to the one or more processors and configured to generate a display comprising:
a selectable first region configured to display the execution quality in real-time in a graphical format simultaneously with the electronic order information, and
a second region and at least one input area on the display, wherein responsive to a selection of the selectable first region, the second region displays one or more indications of the execution quality of the electronic order.

2. The system of claim 1, wherein the EQCM is further configured to generate and transmit an alert to said trader system when the EQCM determines that an aggregate of one or more execution quality values meets or exceeds a predetermined limit.

3. The system of claim 1, wherein said execution quality comprises an indication of a deviation of a value between an execution price of one or more partial executions and a corresponding real-time market price.

4. The system of claim 1, wherein the execution quality is determined by calculating a difference between a volume-weighted average price indicated within order execution details, and a volume-weighted average price determined from said real-time market data.

5. The system of claim 1, wherein the interactive GUI is further configured to graphically display one or more of the following:
a comparison between a volume included in said one or more partial executions and a volume of order executions pertaining other market participants, a comparison between execution qualities associated with two or more executing venue systems, a listing of a plurality of executing venue systems arranged according to a performance quality metric, and an indication as to what volume of the electronic order remains unfulfilled.

6. The system of claim 1, wherein at least one of the electronic transmissions comprises electronic order information identifying an electronic order that requires multiple partial executions by said executing venue system before the at least one electronic order is completely fulfilled.

7. The system of claim 1, wherein at least one of the electronic transmissions comprises order execution details pertaining to one or more partial executions of the at least one electronic order.

8. The system of claim 7, wherein the EQCM is further configured to:

determine and transmit the execution quality to the trader system each time the order execution details pertaining to one or more partial executions is received by the EQCM, thereby providing the trader system ongoing quality updates before the electronic order is completely fulfilled.

9. The system of claim 1, wherein the one or more indications of the execution quality of the electronic order are color coded.

10. A computer software product, comprising a non-transitory computer-readable storage medium having machine-readable instructions stored thereon for execution by at least one processor, the machine-readable instructions causing the at least one processor to perform a method comprising:

detecting, by a message intercept module, electronic transmissions between a trader system and the executing venue system;

copying, by the message intercept module, at least one of electronic order information and order execution details from the electronic transmissions without impeding any of the electronic transmissions;

receiving, by an execution quality calculation module (EQCM), the electronic order information and the order execution details form the message intercept module;

receiving, by the EQCM module, real-time market data contemporaneously with the order execution details, the real-time market data originating from an external data source;

determining, by the EQCM module, an execution quality based on the real-time market data and the order execution details;

transmitting, by the EQCM module, the execution quality to the trader system; and generating, by an interactive graphic user interface (GUI), a display comprising:

a selectable first region configured to display the execution quality in real-time in a graphical format simultaneously with the electronic order information, and a second region and at least one input area, wherein responsive to a selection of the selectable first region, the second region displays one or more indications of the execution quality of the electronic order.

11. The computer software product of claim 10, wherein the machine-readable instructions further cause the processor to generate and transmit an alert to said trader system when an aggregate of one or more execution quality values meets or exceeds a predetermined limit.

12. The computer software product of claim 10, wherein said execution quality comprises an indication of a deviation of a value between an execution price of one or more partial executions and a corresponding real-time market price.

13. The computer software product of claim 10, wherein the execution quality is determined by calculating a difference between a volume-weighted average price indicated within order execution details, and a volume-weighted average price determined from said real-time market data.

14. The computer software product of claim 10, wherein the interactive GUI is further configured to graphically display one or more of the following:

a comparison between a volume included in said one or more partial executions and a volume of order executions pertaining other trading systems, a comparison between execution qualities associated with two or more executing venue systems, a listing of a plurality of executing venue systems arranged according to a performance quality metric, and an indication as to what volume of the electronic order remains unfulfilled.

15. The computer software product of claim 10, wherein at least one of the electronic transmissions comprises electronic order information identifying an electronic order that requires multiple partial executions by said executing venue system before the at least one electronic order is completely fulfilled.

16. The computer software product of claim 10, wherein at least one of the electronic transmissions comprises order execution details pertaining to one or more partial executions of the at least one electronic order.

17. The computer software product of claim 16, further comprising:

determining and transmitting, by the EQCM, the execution quality to the trader system each time the order execution details pertaining to one or more partial executions is received by the EQCM, thereby providing the trader system ongoing quality updates before the electronic order is completely fulfilled.

18. The computer software product of claim 10, wherein the one or more indications of the execution quality of the electronic order are color coded.

19. A method, comprising:

detecting, by a message intercept module operatively coupled to one or more processors configured to execute machine-readable instructions, electronic transmissions between a trader system and an executing venue system via one or more communication links;

copying, by the message intercept module, at least one of electronic order information and order execution details from the electronic transmissions without impeding any of the electronic transmissions;

receiving, by an execution quality calculation module (EQCM) operatively coupled to the one or more processors, the electronic order information and the order execution details from the message intercept module;

receiving, by the EQCM module, real-time market data contemporaneously with the order execution details, the real-time market data originating from an external data source;

determining, by the EQCM module, an execution quality based on the real-time market data and the order execution details;

transmitting, by the EQCM module, the execution quality to the trader system; and generating, by an interactive graphic user interface (GUI) operatively coupled to the one or more processors, a display comprising:

a selectable first region configured to display the execution quality in real-time in a graphical format simultaneously with the electronic order information, and a second region and at least one input area, wherein responsive to a selection of the selectable first region, the second region displays one or more indications of the execution quality of the electronic order.

20. The method of claim 19, wherein the EQCM is further configured to generate and transmit an alert to said trader system when the EQCM determines that an aggregate of one or more execution quality values meets or exceeds a predetermined limit.

21. The method of claim 19, wherein said execution quality comprises an indication of a deviation of a value between an execution price of one or more partial executions and a corresponding real-time market price.

22. The method of claim 19, wherein the execution quality is determined by calculating a difference between a volume-weighted average price indicated within order execution details, and a volume-weighted average price determined from said real-time market data.

23. The method of claim 19, wherein the interactive GUI is further configured to graphically display one or more of the following:

a comparison between a volume included in said one or more partial executions and a volume of order executions pertaining other market participants, a comparison between execution qualities associated with two or more executing venue systems, a listing of a plurality of executing venue systems arranged according to a performance quality metric, and an indication as to what volume of the electronic order remains unfulfilled.

24. The method of claim 19, wherein at least one of the electronic transmissions comprises electronic order information identifying an electronic order that requires multiple partial executions by said executing venue system before the at least one electronic order is completely fulfilled.

25. The method of claim 19, wherein at least one of the electronic transmissions comprises order execution details pertaining to one or more partial executions of the at least one electronic order.

26. The method of claim 25, further comprising:

determining and transmitting, by the EQCM, the execution quality to the trader system each time the order execution details pertaining to one or more partial executions is received by the EQCM, thereby providing the trader system ongoing quality updates before the electronic order is completely fulfilled.

27. The method of claim 19, wherein the one or more indications of the execution quality of the electronic order are color coded.

* * * * *